Dec. 8, 1925.

F. L. SORENSEN

COMBINED DIVIDERS AND PENCIL

Filed Sept. 5, 1924

1,564,908

Inventor
Frank L. Sorensen

By Eccleston & Eccleston
Attorneys

Patented Dec. 8, 1925.

1,564,908

UNITED STATES PATENT OFFICE.

FRANK L. SORENSEN, OF SIOUX CITY, IOWA.

COMBINED DIVIDERS AND PENCIL.

Application filed September 5, 1924. Serial No. 736,052.

*To all whom it may concern:*

Be it known that I, FRANK L. SORENSEN, a citizen of the United States, residing at Sioux City, in the county of Woodbury and State of Iowa, have invented certain new and useful Improvements in a Combined Dividers and Pencil, of which the following is a full, clear, and exact description.

This invention relates to measuring instruments and more especially to such instruments which are used in the Babcock test for determining the butter fat content in liquid dairy products. In measuring the height of the butter fat column it is usual to employ calipers or dividers which are applied to the neck of the bottle or test tube with the legs at the top and bottom of the column. This measurement is then applied to the printed schedule of percentages and the percentage read off. The operator then lays aside the dividers and writes down the butter fat percentage.

It is an object of the present invention to combine with the caliper or dividers a pencil or other marking device, the arrangement being such that the measurement may be taken, the percentage read from the schedule and written in a record book without removing the instrument from the hand.

A further object of the invention resides in so mounting the pencil with respect to the dividers that the former acts as a brake upon the latter to prevent inadvertent relative movement of the legs.

Other objects and advantages of the invention will be apparent from the following description when taken in connection with the accompanying drawings, in which, Figure 1 is a perspective view of the device in use and measuring the height of the column of butter fat;

Figure 1:
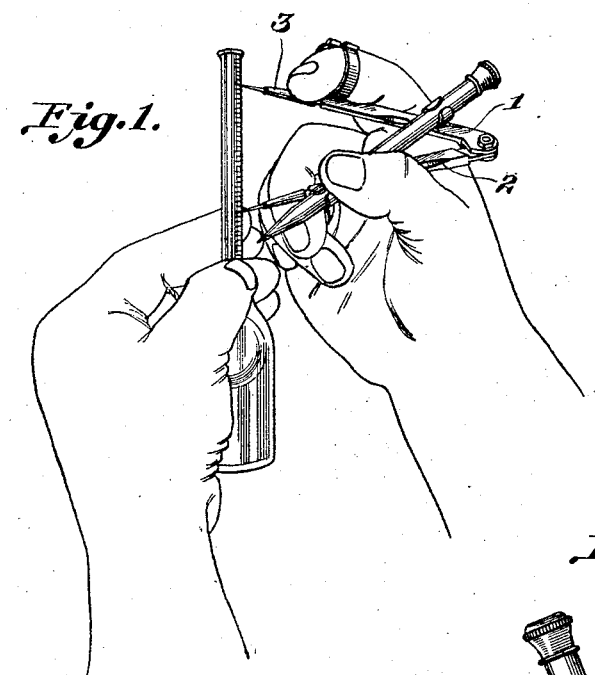
Figure 4:
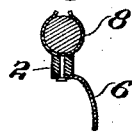
Fig. 4 is a section taken on the line 4—4 of Fig. 3.

Referring to the drawings more in detail, numeral 1 indicates generally the combined dividers or caliper and pencil. The dividers comprise two legs 2 and 3 pivotally connected at their upper ends as indicated by numeral 4.

Figure 2:
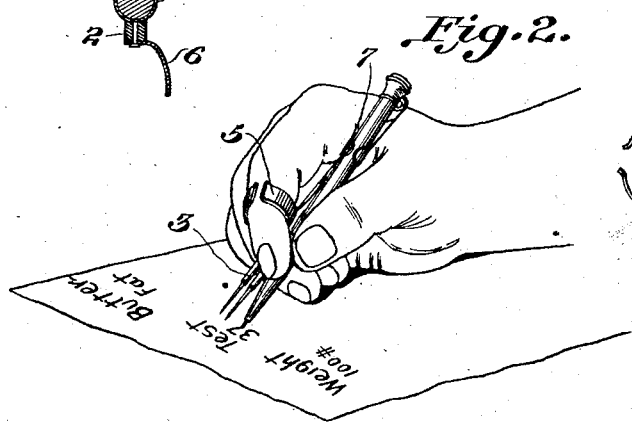
Fig. 2 is a perspective view of the device shown as making a record of the measurement.
Figure 3:
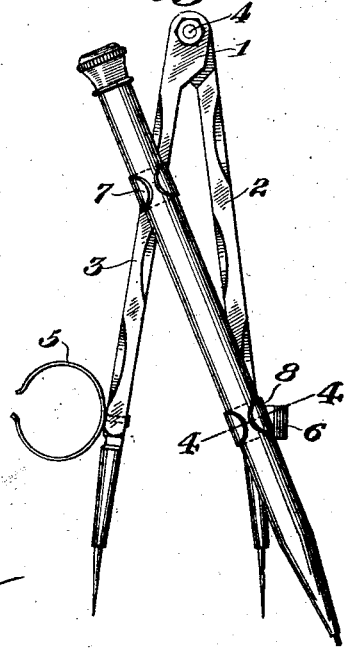
Fig. 3 is an enlarged elevational view of the combined dividers and pencil.

These dividers are of the ordinary type, but I have added thereto a finger loop or ring 5 which is swivelly connected to the leg 3 and a substantially flat finger engaging element 6 which is connected to the leg 2. By means of these attachments of the index finger is inserted within the ring 5 and the second finger of the same hand placed in contact with the substantially flat finger-engaging element 6, it will be apparent that the legs of the divider may be readily moved apart or drawn together as desired and as clearly indicated in Figs. 1 and 2.

In order that the data obtained by the use of the dividers may be written down into a permanent record without the necessity of laying aside the instrument, I have provided a marking device which is permanently connected to the dividers, and although in the particular embodiment shown a pencil is employed as the marking device, it will be obvious that a pen or other similar writing implement may be equally well employed if desired.

To this end the leg 3 has swivelly or pivotally connected thereto a clip 7 while the leg 2 carries a similarly mounted clip 8. It should be noted, however, that while the clip 7 tightly grips the pencil the latter may be longitudinally adjusted in the clip as necessary. The clip 8 merely engages the pencil so as to permit a sliding movement therein.

In operation, the legs of the dividers are spread apart the distance desired by means of the index and second fingers of the operator's hand which are engaged in the loop 5 and against the member 6 respectively. In this operation of the dividers it will be apparent that the pencil sliding through the clip 8 will set up a certain amount of friction and thus act as a damping means or brake on the movement of the legs, this action, of course, will also occur when the legs 2 and 3 are moved together, thus giving a more accurate control over the instrument. After the measurement has been taken from the test tube, and the percentage of butter fat obtained in the usual way, the legs of the calipers are again drawn together which movement will slide the pencil or other marking means forward and downward so that its point extends beyond the point of the dividers, thereby placing the same in a position where it may readily be used to write down the data in a book or the like employed for that purpose.

From the foregoing description it will be seen that I have combined with the ordinary dividers a marking device which is so mounted as to act as a damping means on the movements of the legs of the dividers and which also, due to the mounting means, is drawn to an out-of-the-way position when the dividers are to be used, and automatically moved into operative position when the dividers are no longer in use.

In accordance with the patent statutes I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is:

1. In a device of the class described, the combination with dividers having relatively movable legs, of a marking device, and means cooperating with said dividers and marking device to cause a forward extension of the marking device when the divider legs are moved toward each other and to cause a rearward movement of the marking device when the divider legs are spread apart.

2. In a device of the class described, the combination with dividers having relatively movable legs, of a marking device pivotally attached to both legs thereof.

3. In a device of the class described, the combination with dividers having relatively movable legs, of a marking device, means for adjustably attaching the marking device to one leg of the dividers, and means for slidably connecting the marking device to the other leg of the dividers.

4. In a device of the class described, the combination with dividers having relatively movable legs, of a marking device, means for attaching the marking device to one leg of the dividers, means for slidably connecting the marking device to the other leg of the dividers, and a finger-engaging element on each leg.

5. In a device of the class described, the combination with dividers having relatively movable legs, of a marking device, means for pivotally securing the marking device to one leg of the dividers, and means for slidably and pivotally connecting the marking device to the other leg of the dividers.

FRANK L. SORENSEN.